Feb. 17, 1970 J. A. KOLLING 3,496,545

SWITCHING MATRIX

Filed April 18, 1966 3 Sheets-Sheet 1

INVENTOR
JOHN A. KOLLING

BY Thomas J. Nikolai
ATTORNEY

INVENTOR
JOHN A. KOLLING
BY Thomas J. Nikolai
ATTORNEY

Feb. 17, 1970 J. A. KOLLING 3,496,545

SWITCHING MATRIX

Filed April 18, 1966 3 Sheets-Sheet 3

INVENTOR
JOHN A. KOLLING
BY Thomas J. Nikolai
ATTORNEY

United States Patent Office 3,496,545

Patented Feb. 17, 1970

3,496,545

SWITCHING MATRIX

John A. Kolling, St. Paul, Minn., assignor to Sperry Rand Corporation, New York, N.Y., a corporation of Delaware Filed Apr. 18, 1966, Ser. No. 543,263
Int. Cl. H04q 3/50
U.S. Cl. 340—166 5 Claims

ABSTRACT OF THE DISCLOSURE

A switching matrix that utilizes transistors at the intersections of the orthogonally arranged sets of drive lines. The drive lines are strip transmission lines with the switching transistors' base-emitter electrodes spaced along the intersecting drive lines at intervals determined by the frequency of the control signals.

This invention relates generally to binary digital-signal translators, especially those adapted for rapidly switching large magnitude currents.

Electronic digital computers have their operational speeds primarily limited by the cycle time of their internal, addressable memory system. A good portion of a memory cycle time can be consumed by receiving the address signals and then translating such signals into selection signals usable within the memory. In memories of the static magnetic type the selection currents are quite large and are provided through a relatively low impedance circuit. Accordingly, it is desired that a magnetic core memory address translator or decoder operate rapidly and provide a high magnitude current to a magnetic memory array with the minimum of components.

Accordingly, it is an object of this invention to provide an improved signal decoder usable with a high speed memory system.

It is another object of this invention to provide a signal translator that preserves the input signal wave shape and rapidly provides a single high current selection output signal.

It is the further object of this invention to provide a compact arrangement for forming a binary signal decoder.

In summary, this invention comprises crossing sets of electrically-independent strip-type transmission lines, one set of which is connected at various points to base electrodes of switching transistors. The other set of transmission lines are preferably connected to the emitter electrodes of such transistors at spaced-apart points. The collector of the transistors are respectively connected to other strip transmission lines that lead into the memory array and are designed to receive a single selection signal as will become apparent. The transistors are kept at current cut-off by a continuous bias current provided through both the base- and emitter-connected strip lines. At the end remote from the bias source a current pulse driver selectively applies a pulse to the base and emitter strip lines for causing one and only one transistor to be placed in a current-conducting state for activating a memory drive line. The turn-on and turn-off of the transistor switch is designed to prevent signal reflections in any of the transmission lines. Further signal loading of the base electrode strip line is minimized by placing a low capacitance diode in series with the base electrode and the connection to the strip.

These and other more detailed and specific objects will be disclosed in the course of the following specification, reference being had to the accompanying drawings, in which.

Figure 1:
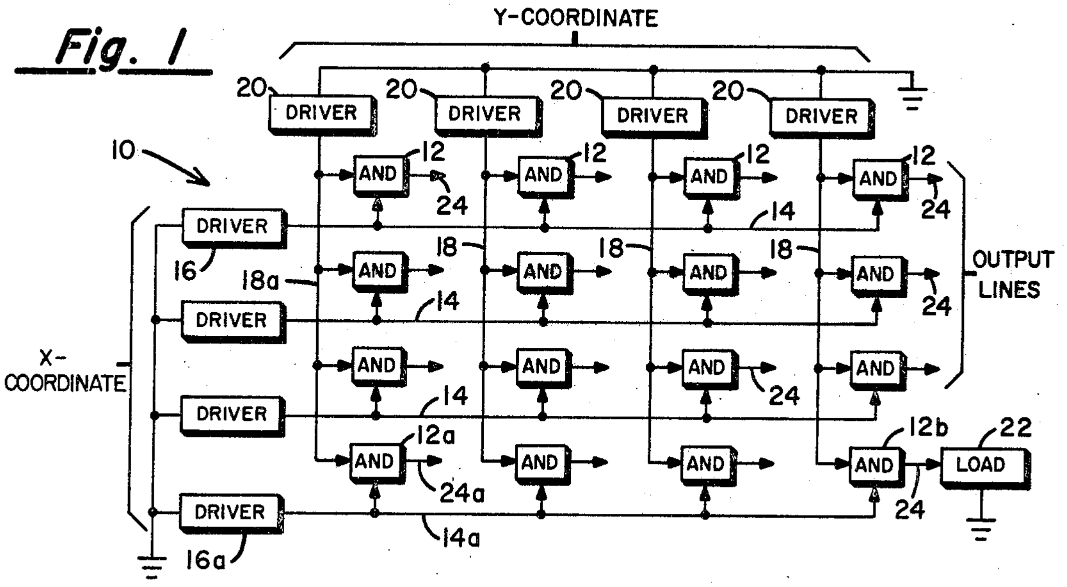
FIG. 1 is a simplified logic block diagram of a translator illustrating the logic of an embodiment of this invention.

With more particular reference now to the appended drawings, like numerals indicate like parts and constructional features in the various views. In FIG. 1 there is shown an array 10 of coincidence or AND elements 12 used to convert electrical digital signal inputs at the X and Y coordinates to one and only one output signal that is capable of activating a memory drive line type of load. A single X-coordinate signal is provided over a selected one of the base drive lines 14 forming one input to a row of the elements 12. A single electrical impulse is provided over the line 14 by a selected one of the line drivers 16, which may be a single-pulse generator well-known in the electrical arts. Correspondingly, the signal inputs at the Y-coordinate are provided over what is termed the emitter drive lines 18, respectively, by the drivers 20 which may be constructed in a manner similar to the drivers 16. It will be appreciated that in each of the coordinates all drivers but one will provide a signal such as to disable or block the AND circuits 12 inhibiting them from emitting an output signal for activating the load 22 to perform a desired function. One and only one of each of the drivers 16 and 20 will provide an actuating type of signal, as will become apparent, for selecting one and only one of the elements 12 to provide a single usable output signal to the respectively associated load (memory line) 22 on the respectively associated output line 24.

Figure 2:
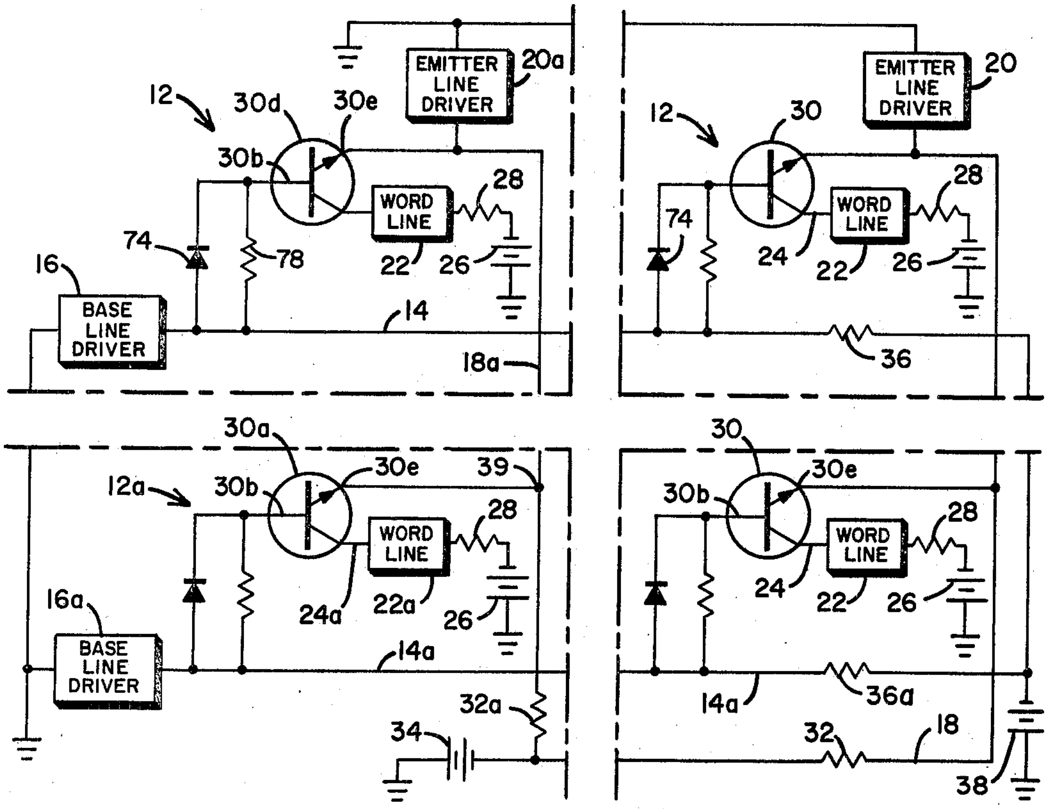
FIG. 2 is an abbreviated electrical schematic diagram of circuits used in the FIG. 1 translator according to the teachings of this invention.

Referring now to FIG. 2, the particular illustrated circuit configuration is designed to provide an ultra-fast selection, decoding or translation of the X and L coordinate input signals to activate one and only one output line 24. Each of the loads 22 is shown as a memory drive line which has one end connected to a battery source 26 through a terminating impedance 28 which source 26 provides the collector supply voltage and current to transistor elements 30 and which transistors constitute the active portion of the respective coincidence elements 12. In practice, batteries 26 are a single unit; however, for clarity it is shown as a plurality of batteries. By providing appropriate signals on the emitter and base electrodes of the transistors 30 an AND, or coincidence, function is provided, the output signal being provided through the collector electrode. The drive lines 14 and 18 preferably are strip-type transmission lines having a characteristic impedance of 40 ohms as will be subsequently described with reference to FIG. 3.

The electrical conditions in the translator during an unselected or quiescent condition will be first described, i.e., when there are no activating input signals provided by the drivers 16 or 20. All of the transistors 30 are biased to collector current cut-off in the following described manner. The emitter drive lines 18 are connected through a terminating resistance 32 to a common emitter-line-biasing-battery 34 each of which, in combination with the respective drivers 20, provides a current through the lines 18 to place the transistor 30 emitters 30*e* at a —14.0 volts with respect to ground potential.

The base drive lines 14 are respectively terminated in the resistances 36 connected to the common bias source 38 for providing a current therethrough flowing from the drivers 16 to provide a voltage on the lines 14 of —24.3 volts with respect to ground. From this it is apparent that the emitter-base junctions of transistors 30 are reverse biased by about 10 volts.

The first step in actuating the translator 10 to provide a single activating output signal is to change the bias voltage on one of the lines 14, such as 14*a* at the base driver 16*a* from —24.3 volts to —14 volts with respect to ground. Accordingly, since the line 14*a* is a strip transmission line, a positive wave-front with respect to —24.3 volts will be propagated from the driver 16*a* toward terminating impedance 36*a*. This wave-front will pass the various base electrodes 30*b* that are coupled to the line 14*a* at varying times depending upon the distance between the driver 16*a* and that electrode. The bias of the emitter-base junctions of the transistors 30 that are coupled to the line 14*a* has now been changed from —10 volts to essentially zero volts. Because of the impedances involved in the circuit, the transistors are still in the collector current cut-off condition but are placed at the brink or verge of collector-current conduction such that a very slight change from zero volts bias to a positive bias can occur very quickly by changing the voltage on the respective emitters 30*e*.

The above described electrical condition wherein one of the transistors 30 electrodes has a voltage applied thereto is termed a "half-selected" condition, i.e., by arbitrary definition, one of the two digital or bivalued signals necessary to place the transistors 30 into collector current conduction has been satisfied.

The second step in the translation of the X and Y signals is to change the voltage on the selected emitter drive line such as line 18*a* from —14 volts to —17 volts. This is caused by changing the output signal from the emitter driver 20*a* to cause a —3 volt wave to be propagated toward terminating impedance 32*a* over the strip transmission line 18*a*. The first and second steps may be initiated simultaneously as well as sequentially.

In the instant illustration the element 12*a* (transistor 30*a* is conducting) is activated by the signals on lines 14*a* and 18*a* caused by the respective drivers 16*a* and 20*a* to provide a current flow over its collector line 24*a*, word line 22*a*, resistance 28 as provided by the battery 26. The current pulse from the driver 20*a* is diverted from the line 14*a* through the selected transistor 30*a* and does not proceed to the end of the line 14*a*.

All of the transistors, excepting 30*a*, having their emitters connected to the line 18*a* are also in a so-called "half-selected" condition. Consider transistor 30*d* having a base voltage of —24.3 voltages (unselected or inactivated) and an emitter voltage of —17 volts (selected or activated). By limiting the base line voltages to two magnitudes, i.e., —14 and —24 volts only the base voltage need be changed to make the transistor 30*d* conductive and, thus provide a current output to its connected load 22.

From the above description it should be apparent that under the described operation only transistor 30*a* will be in the conductive state to permit a current flow through its connected load 22*a* whereas all of the remaining transistors 30, and therefore coincidence elements 12, are providing no conductive path to permit current flow through their respective connected loads 22.

The signal pulses on the base and emitter drive lines are designed such that the base drive pulse subsides first. In effect, a second pulse is then propagated from the bias end of the strip line proceeding toward the driver 16. The full effect of the nonconducting transistors on the operation of the base drive line will be more fully described with respect to FIG. 5.

Subsequent to the turn-off of the base drive pulse, the emitter drive pulse on line 18*a* subsides. It will be remembered that the leading edge, or wave front, of the driver 20 emitted pulse never goes beyond the conducting transistor as it is diverted through the selected transistor. As this pulse subsides at the emitter connection at the emitter of transistor 30*a*, the current provided by the battery 34 then provides a pulse which is propagated from junction 39 (FIG. 2) toward the driver 20*a*. There is a reversal of current direction at this time in the emitter line 18*a* causing a pulse to propagate toward driver 20*a*. The driver 20*a* is terminated in 40 ohms for preventing reflections within the emitter line, placing it in condition to be immediately reactivated.

The drivers 16 and 20 are actuated substantially simultaneously and the respective activating pulses will be propagated over the lines 14 and 18 reaching the various electrodes of the transistors 30 at differing times. The pulse width of the activating pulse from the respective drivers 16, 20 is designed to the slightly greater than the propagation time of a pulse over the strip transmission lines 14, 18 such that the "half-select" condition on the respective elements 12 will remain until the wave front of the selecting pulse in the other coordinate (line 14) has reached that electrode. For example, in the line 14*a* the activating pulse from driver 16*a* at one instant of time will be present on all of the base electrodes 30*b* of the transistors 30 connected to that line. Simultaneously, the activating pulse on emitter line 18*a* will be present at all of the emitter electrodes 30*e* connected to that line. Therefore, the remote transistor 30*a* on the line 18*a* is activated into conduction irrespective of the propagation time of the pulses down the respective transmission lines.

It should be further noted that the transmission lines have a characteristic impedance, and it is well-known that for efficient energy transfer without reflection the energy must be transferred into and out of the line either through an impedance transformer or into a device having the same impedance as the characteristic impedance of the line. It was aforestated that the impedance of the lines 14 and 18 each were selected to be 40 ohms. When the transistor 30*a* is switched into conduction, it provides essentially zero impedance between its collector and emitter for directly connecting the emitter line 18*a* to the word line 22*a* which has an impedance of 20 ohms.

It is remembered that after the base drive line 14*a* has been pulsed the transistor 30*a* is biased at the verge of nonconduction. The pulse on emitter drive line 18*a* is operative when reaching the emitter 30*e* of transistor 30*a* to switch it into conduction providing a low impedance current path to the load 22*a*. Note that the driver 20 pulse does not pass the emitter connection to line 18*a*. Rather the current flowing through the line 18*a* from the battery source 34 is directed through the transistor 30*a* and the current flowing from the driver 20*a* is likewise directed through said transistor. Therefore the load 22 having a characteristic impedance of 20 ohms is driven effectively by two parallel 40 ohm lines. This mode of operation provides an impedance match at 20 ohms because the two 40 ohm lines when paralleled are the same as the 20 ohm line. Thus applicant has provided a new simple and efficient method of coupling a 40 ohm line to a 20 ohm line through a switching transistor without reflection and at a high frequency of operation.

Figure 3:
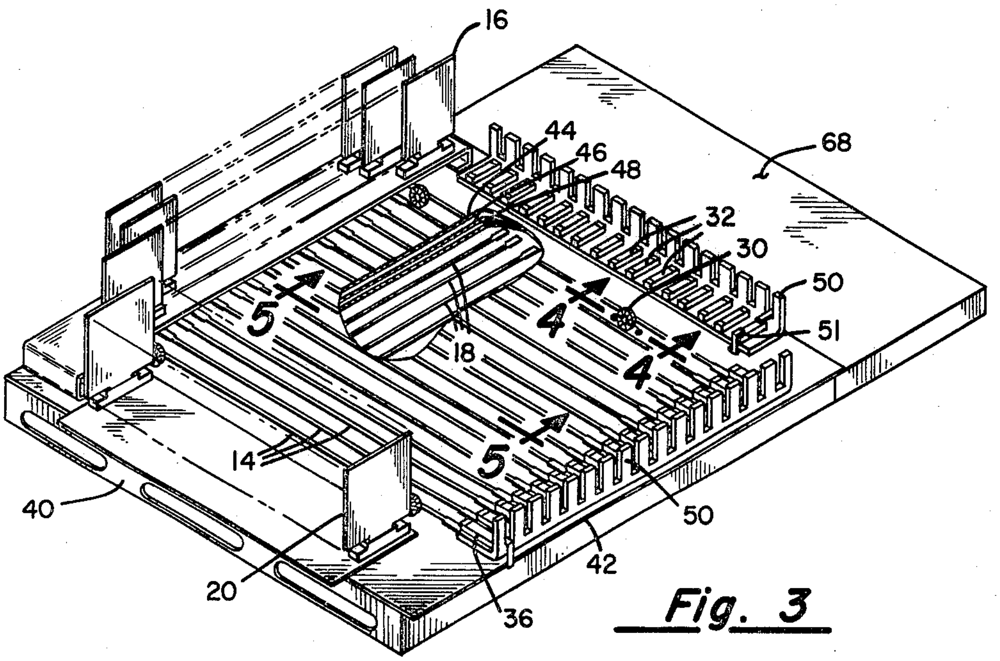
FIG. 3 is a simplified and reduced perspective view of the preferred embodiment of this invention having a cutaway portion that is greatly enlarged to clearly show the various layers of the laminated translator or decoder construction.
Figure 4:
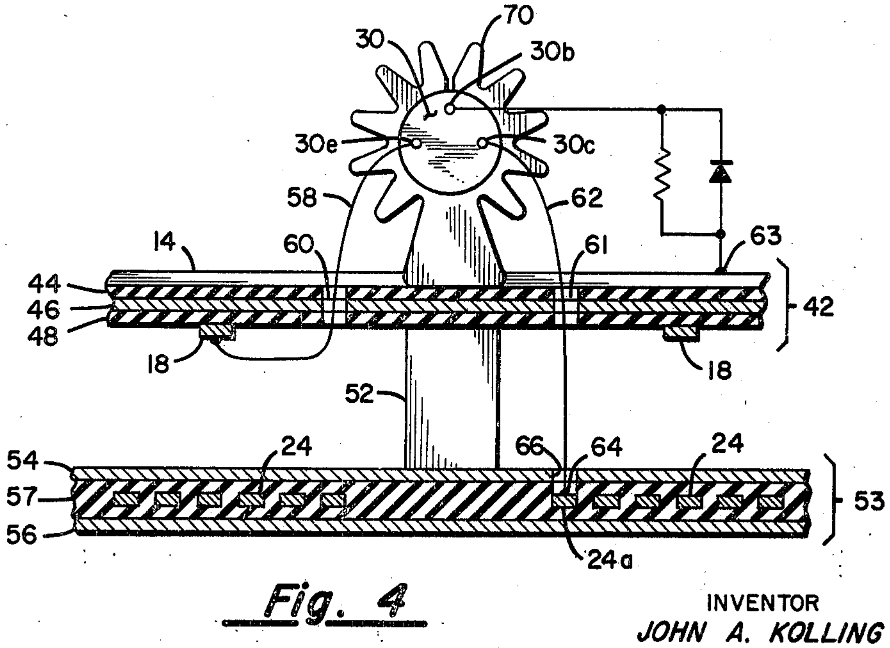
FIG. 4 is a cross-sectional view as seen in the direction of the arrows along line 4—4 in FIG. 3.

Referring now to FIG. 3, the physical construction of the preferred embodiment is shown in a simplified perspective view. The translator apparatus and connections are suitably mounted on a frame 40, which is insertable into a cabinet (now shown). On the upper side of the frame 40 there is disposed a laminated assembly 42 best seen in the cut-away portion which is greatly enlarged to more clearly illustrate the various laminae. The base drive lines 14 consist of layered conductors suitably secured to the dielectric base 44 which has affixed thereto on its underside a copper ground plane 46. The electrical properties of the layered conductor 14 spaced from a ground plane 46 by a high quality dielectric forms a strip transmission line well understood in the art. Immediately below and attached to the plane 46 is a second dielectric layer 48 that supports the layered emitter drive lines 18 extending transversely to the drive lines 14. The laminated structure 42 can be held together by a suitable epoxy adhesive. The terminating resistors 32 and 36 are suitably secured as by spring clips in the holders 50 disposed along two sides of the laminate 42. The lines 18 extend through the laminate 42 as at 51 to connect to their respective terminating resistors 32. The remote ends of the resistors 32 and 36 are connected to battery sources (not shown in FIG. 3). The base line drivers 16 are suitably mounted on printed circuit cards along one edge of the laminate 42 while the emitter drivers 20 are mounted in a similar manner along a second edge of the laminate 42. The electrical connections between the drivers and the lines are made in the usual manner. For purposes of clarity, only a few of the transistors 30 are shown in FIG. 3 it being understood in an actual embodiment there is one transsitor for each crossing of lines 14 and 18. The output lines 24 that are connected to the memory array drive lines are formed on the lower side of the frame 40 between ground planes 54 and 56 as best seen in FIG. 4.

The laminate 42 has affixed thereto in spaced-apart relation a plurality of dielectric spacing bars 52 that fixedly attach the strip line construction 53, including the lines 24, to the laminate 42. Note the geometry of the connections is such that a thin assembly is provided, making a compact ararngement of translators and drive line connections.

The lines 24 are formed in what is termed a triplate strip line transmission system. Two ground planes 54 and 56 are suitably laminated on either side of the various conductors 24 on the insulation or dielectric 57.

If it is desired to make a single laminate to include both the translator drive lines 14 and 18 and the output lines 24, the physical configurations and sizes of the respective layered conductors in the translator may be changed such that the characteristics impedances are maintained in proper relationship.

The connections between the transistors 30 and the respective strip line conductors will now be described. The emitter 30*e* has a lead 58 extending downwardly through an aperture 60 in the laminate 42 suitably insulated from the base drive line 14 and connected on the other side as by soldering to the appropriate emitter drive line 18. The aperture 60 is preferably spaced between two of the lines 14 (FIG. 3) and offset from the lines 18 to permit a more facile connection to the line 18. The collector electrode is connected as by line 62 through a similar aperture 61 in the laminate 42 and is soldered to the appropriate conductor 24 as exposed through the ground plane 54 by aperture 66. The base 30*b* is connected to line 14 as at 63. The lines 24 extend parallel to the lines 18 terminating in the memory array generally indicated by numeral 68, the construction of which is not pertinent to this invention. As shown, the transistors 30 are supported in a finned heat conductive support 70 positioned on top of laminate 42.

As alluded to above, if a single laminate is desired, the respective lines 18 would have a layered conductor extending through the aperture 60 to facilitate connection to the emitter electrode 30*e*.

Figure 5:
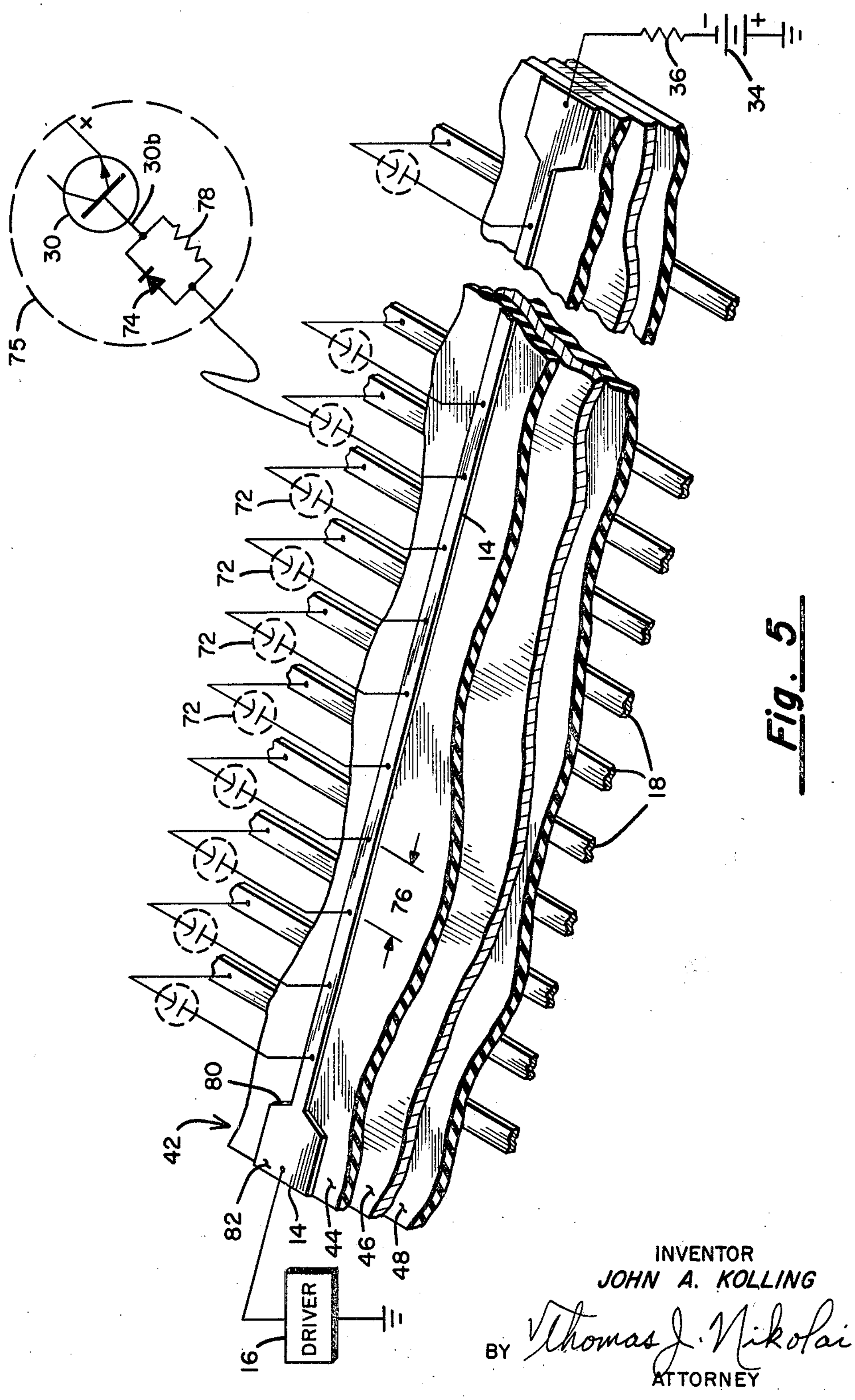
FIG. 5 is an enlarged and simplified modified perspective view showing the electrical properties of a transmission line in the laminated translator as seen generally in the direction of the arrows along line 5—5 in FIG. 3, wherein the thicknesses of the layers are exaggerated for clarity.

Referring now to FIG. 5, the base electrode circuits of the transistors 30 are schematically represented by the encircled capacitances 72 as spaced along the line 14. This representation indicates that the transistors 30 are all in the current cut-off condition and the loading provided to the line 14 is merely the junction and other distributed capacities associated with the transistor circuit. In order to reduce the loading, a low capacitance diode 74 is placed in series with the base electrode 30*b* of the transistor 30. This is shown in FIG. 5 in the large circle 75. With respect to the line 14, the diode 74 capacitance is in series circuit with the transistor 30 capacitance. The transistor 30, for example, may have a capacitance of 100 picopicofarad whereas the diode 74 has but a 5 picopicofarad capacitance. Because the capacitances are in series, the lower value will have the larger affect on the loading of the line 14. In this manner the diode 74 is used to advantage in reducing the parasitic capacitive loading on the line 14.

The base connections to the line 14 are spaced-apart a distance indicated by the numeral 76. Because the line 14 is of a transmission type, it is desirable to have the loading behave as distributed capacitances. Accordingly, the distance 76 is made less than one-fourth wave length of the highest frequency provided to the line 14. The lumped loading provided by the individual capacitances is now treated as a distributed capacitance.

The effect of the subsiding of the driver 16 pulse will now be described. The transistor 30 is selected to be of the type having fast minority current recovery. In other words, the charge storage of the transistor 30 is removed before the charge storage of the diode 74. The transistor 30 minority carriers as well as the diode 74 carriers are dissipated through the resistor 78. The advantage of this is that the transistor 30 is placed in the collector current cut-off condition almost immediately, permitting the emitter line 18 voltages to be removed than if the diode 74 carriers were removed first.

The physical construction of the strip transmission lines should follow good high frequency practice. The line 14, having a 40-ohm characteristic impedance is connected via tapered section 80 to the land connection area 82 to prevent a sharp change in characteristic impedance such as would provide distortions and reflections of the electrical signals in the line.

What is claimed is:

1. A switching matrix comprising:

a rectangular array of coincidence elements having control, signal input and signal output terminals and arranged in rows and columns;

a conductive strip transmission line exhibiting a characteristic impedance connecting the control terminals in the respective rows;

a conductive strip transmission line exhibiting a characteristic impedance connecting the signal input terminals in the respective columns;

means for providing a current bias through each of the row and column lines;

driver means for providing a selecting current pulse on one of said row lines in opposition to said bias;

driver means for providing a current pulse on a selected one of said column lines in opposition to the bias current therein; and, the coincidence element which receives both current pulses being responsive thereto to provide a current path at its output terminal.

2. The apparatus as in claim 1 further including a low capacitance diode respectively connected between the control terminals and the row lines and being poled to oppose current flow between the row and column lines in the absence of said current pulses.

3. The apparatus as in claim 1 wherein the connections between the coincidence elements and respectively the row and column lines are spaced apart on said lines less than one-fourth the wave length of the highest frequency signal provided to said lines.

4. The apparatus as in claim 1, further including a load connected to each of the output terminals having an impedance equal to one-half the characteristic impedance of the column transmission line.

5. Apparatus as in claim 4 wherein the load includes a transmission line exhibiting a characteristic impedance.

References Cited

UNITED STATES PATENTS

| | | | |
|---|---|---|---|
| 3,115,617 | 12/1963 | Fries | 340—166 |
| 3,354,435 | 11/1967 | Picciano | 340—166 |

JOHN W. CALDWELL, Primary Examiner

MICHAEL R. SLOBASKY, Assistant Examiner